United States Patent [19]

Trahan

[11] Patent Number: 5,655,481

[45] Date of Patent: Aug. 12, 1997

[54] HAND-HELD PET GROOMING APPARATUS

[76] Inventor: Wendy Trahan, 247 Cenac St., Houma, La. 70364

[21] Appl. No.: 578,285

[22] Filed: Dec. 26, 1995

[51] Int. Cl.$^6$ .................................................. A01K 13/00
[52] U.S. Cl. .................................................. 119/606
[58] Field of Search .................................. 119/605, 606, 119/608, 609, 611, 612, 613, 614, 615, 616; 15/344, 402

[56] References Cited

U.S. PATENT DOCUMENTS

| | | | |
|---|---|---|---|
| 2,972,160 | 2/1961 | Hahn | 119/605 |
| 4,011,624 | 3/1977 | Proett | 15/344 |
| 4,577,365 | 3/1986 | Yuen | 15/339 |
| 4,799,460 | 1/1989 | Kuhl | 119/606 |
| 5,211,131 | 5/1993 | Plyler | 119/606 |

Primary Examiner—Thomas Price

[57] ABSTRACT

A hand-held pet grooming apparatus including a housing that has an upper end with a switch extending and a lower end with a plurality of passages. The housing has a mechanism located therein for generating a vacuum when activated by the switch. Included is a vacuum chamber that is disposed within the housing unit and adjacent the lower end. The mechanism is capable of inducing air through the passages and into the vacuum chamber when activated. An air chamber separates the vacuum chamber and the mechanism of the housing. The lower end of the housing has a plurality of bristles that are capable of engaging pet hair when the mechanism generates air for passage through the vacuum chamber. Lastly, a hair catch member is positionable within the vacuum chamber of the housing. The hair catch member collects hair and debris that is lose from the pet when the bristles engage the pet, while the mechanism is activated.

1 Claim, 3 Drawing Sheets

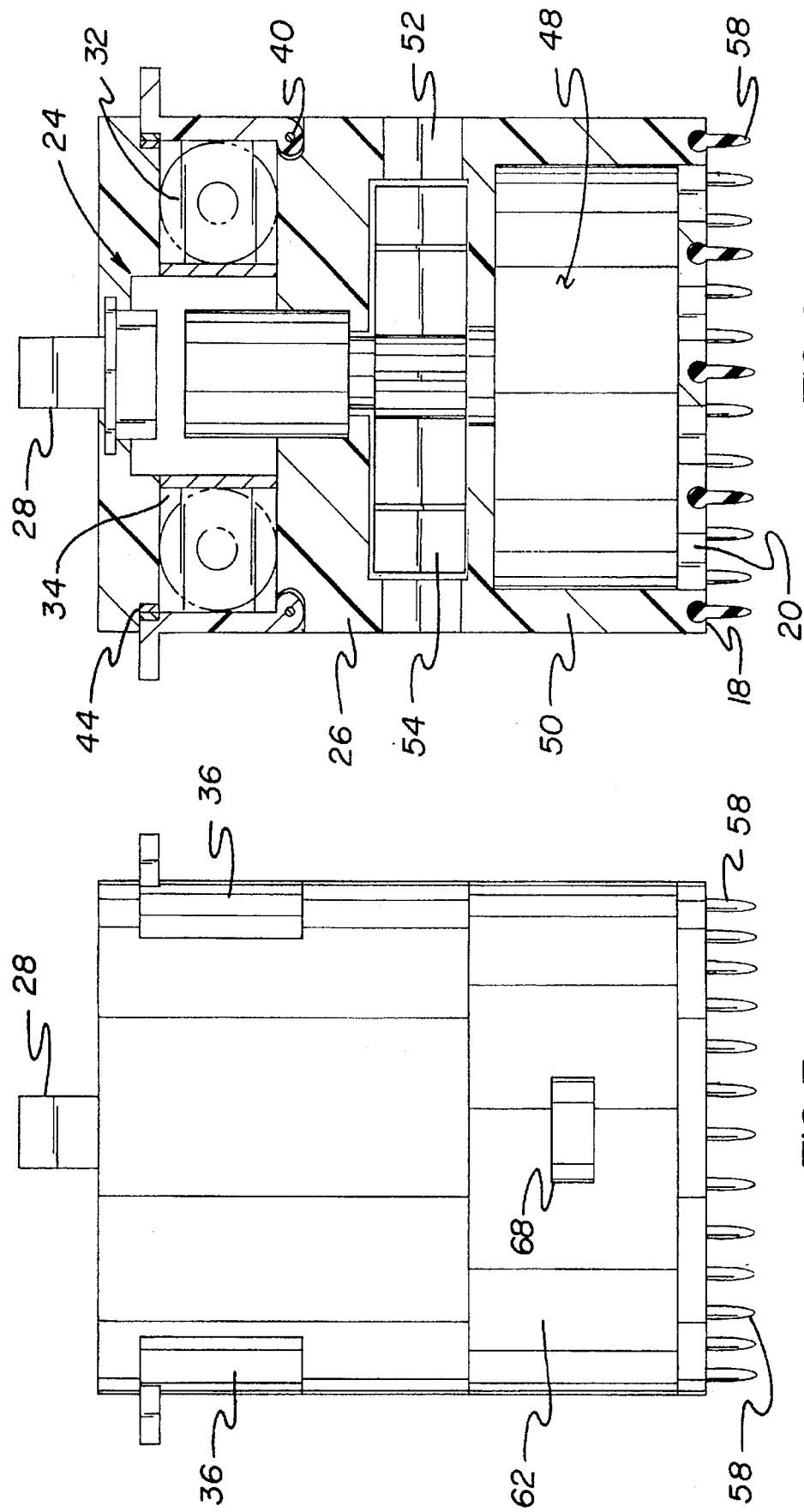

HAND-HELD PET GROOMING APPARATUS

BACKGROUND OF THE INVENTION

1. Field of the Invention

The present invention relates to a hand-held pet grooming apparatus and more particularly pertains to providing a cylindrical hand-held apparatus that can be used to groom pet hair, and further providing a mechanism creating a vacuum for removal of the loose hair as the pet is being groomed.

2. Description of the Prior Art

The use of vacuumed pet combs is known in the prior art. More specifically, vacuumed pet combs heretofore devised and utilized for the purpose of vacuum grooming of animals are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,231,762 to Hunts discloses a grooming attachment for vacuum-drawn clippers. U.S. Pat. No. 5,211,131 to Plyler discloses a pet grooming device with detachable head. U.S. Pat. No. 5,095,853 to Kruger discloses a vacuum cleaned pet comb. U.S. Pat. No. 5,088,199 to Romani discloses a variable vacuum attachment for hair grooming clippers. Lastly, U.S. Pat. No. 5,259,116 to Laube discloses an animal grooming clipper.

While these devices fulfill their respective, particular objectives and requirements, the aforementioned patents do not describe hand-held pet grooming apparatus that allows hair and debris to be loosen, when the bristles are combed through the hair, to be captured in a vacuum-type apparatus.

In this respect, the hand-held pet grooming apparatus according to the present invention substantially departs from the conventional concepts and designs of the prior art, and in doing so provides an apparatus primarily developed for the purpose of providing a cylindrical hand-held apparatus that can be used to groom pet hair, and further providing a mechanism creating a vacuum for removal of the loose hair as the pet is being groomed.

Therefore, it can be appreciated that there exists a continuing need for a new and improved hand-held pet grooming apparatus which can be used for providing a cylindrical hand-held apparatus that can be used to groom pet hair, and further providing a mechanism creating a vacuum for removal of the loose hair as the pet is being groomed. In this regard, the present invention substantially fulfills this need.

SUMMARY OF THE INVENTION

In view of the foregoing disadvantages inherent in the known types of vacuumed pet combs now present in the prior art, the present invention provides an improved hand-held pet grooming apparatus. As such, the general purpose of the present invention, which will be described subsequently in greater detail, is to provide a new and improved hand-held pet grooming apparatus and method which has all the advantages of the prior art and none of the disadvantages.

To attain this, the present invention essentially comprises a generally cylindrical housing that has a planar upper end and a lower end with a plurality of generally rectangular passages. The housing has a mechanism that is located in the upper portion of the housing for generating a vacuum. The mechanism is capable of being powered by a pair of batteries that are positioned adjacent thereto. The upper portion of the housing has a pair of battery chambers that are positioned on opposite sides of the mechanism and are accessible from exterior the housing. Included is a vacuum chamber that is disposed within the housing unit. The vacuum chambers adjacent the lower end within the bottom portion of the housing. The mechanism is capable of being activated for inducing air through the passages of the lower end of the housing. The air passes through the respective passages of the lower end and into the vacuum chamber to be exhausted out of a pair of exhaust vents that are formed in the housing. An air chamber separates the vacuum chamber and the upper portion of the housing. The air chamber centrally disposed within the housing. The air chamber permits a continuous stream of air, being generated by the mechanism, to pass from the vacuum chamber to and through the housing to exit through both of the exhaust vents. The lower end of the housing has a plurality of individually spaced bristles formed thereon. The bristles project outwardly from the lower end. The bristles are flexible and capable of engaging pet hair when the mechanism generates air for passage through the vacuum chamber. Lastly, a generally cylindrical hair catch member is positioned within the vacuum chamber of the housing. The hair catch member is capable of collecting hair and debris that is loosened from the pet when the bristles engage the pet. The hair catch member has a porous-type material that is attached along a top rim. The porous-type material is capable of allowing air, that is generated by the mechanism, to pass through the catch member when the member is positioned within the vacuum chamber. The catch member may be easily removed from the vacuum chamber, when the mechanism is deactivated, for removal of captured hair and debris.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hand-held pet grooming apparatus which has all of the advantages of the prior art vacuumed pet combs and none of the disadvantages.

It is another object of the present invention to provide a new and improved hand-held pet grooming apparatus which may be easily and efficiently manufactured and marketed.

It is further object of the present invention to provide a new and improved hand-held pet grooming apparatus which is of durable and reliable constructions.

An even further object of the present invention is to provide a new and improved hand-held pet grooming apparatus which is susceptible of a low cost of manufacture with regard to both materials and labor, and which accordingly is then susceptible of low prices of sale to the consuming public, thereby making such hand-held pet grooming apparatus economically available to the buying public.

Still yet another object of the present invention is to provide a new and improved hand-held pet grooming apparatus which provides in the apparatuses and methods of the prior art some of the advantages thereof, while simultaneously overcoming some of the disadvantages normally associated therewith.

Even still another object of the present invention is to provide a hand-held pet grooming apparatus for providing a cylindrical hand-held apparatus that can be used to groom pet hair, and further providing a mechanism creating a vacuum for removal of the loose hair as the pet is being groomed.

Lastly, it is an object of the present invention to provide a new and improved hand-held pet grooming apparatus including a housing that has an upper end with a switch extending and a lower end with a plurality of passages. The housing has a mechanism located therein for generating a vacuum when activated by the switch. Included is a vacuum chamber that is disposed within the housing unit and adjacent the lower end. The mechanism is capable of inducing air through the passages and into the vacuum chamber when activated. An air chamber separates the vacuum chamber and the mechanism of the housing. The lower end of the housing has a plurality of bristles that are capable of engaging pet hair when the mechanism generates air for passage through the vacuum chamber. Lastly, a hair catch member is positionable within the vacuum chamber of the housing. The hair catch member collects hair and debris that is lose from the pet when the bristles engages the pet, while the mechanism is activated.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a frontal view of the present invention in an operable configuration.

FIG. 4 is a cross sectional view of the present invention taken along line 4—4 of FIG. 2.

The same reference numerals refer to the same parts through the various Figures.

DESCRIPTION OF THE PREFERRED EMBODIMENT

Figure 1:
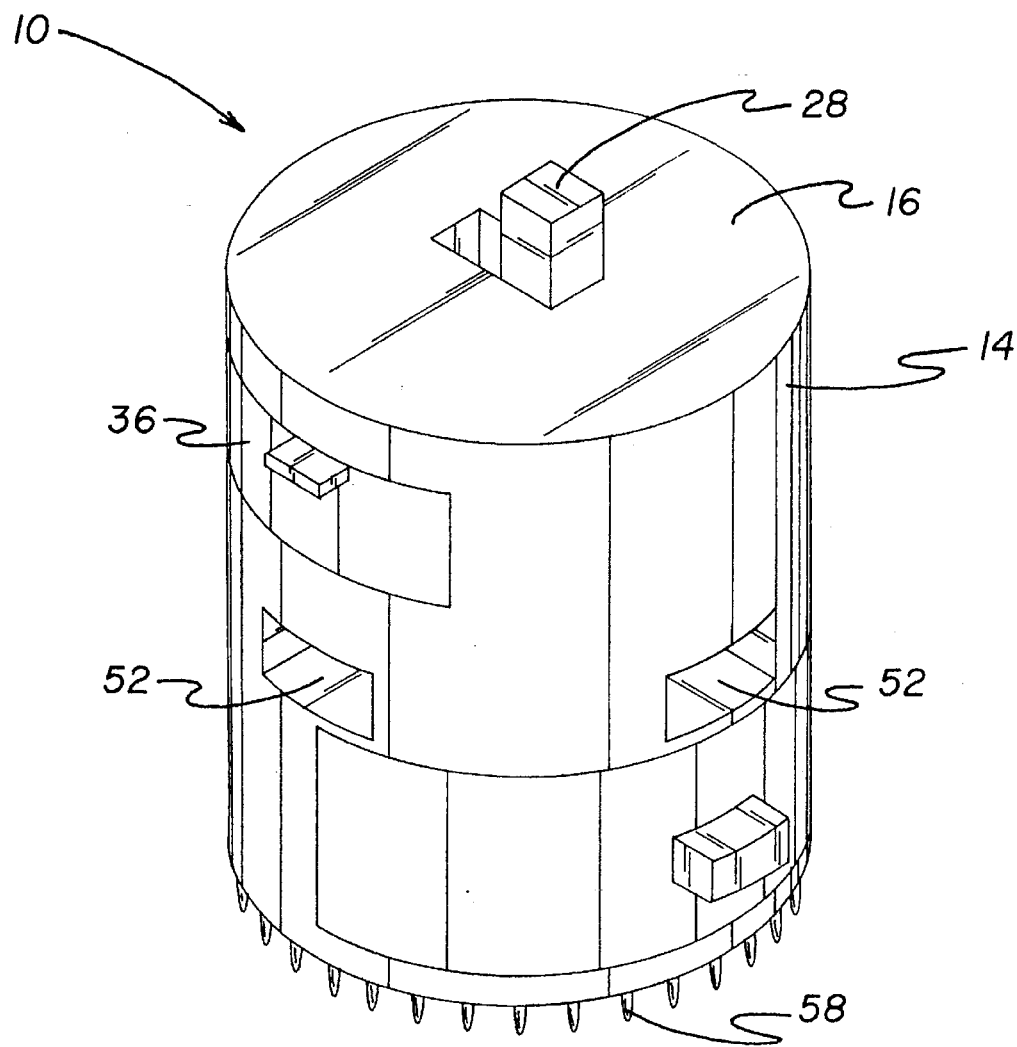
FIG. 1 is a perspective view of the preferred embodiment of the hand-held pet grooming apparatus constructed in accordance with the principles of the present invention.
Figure 2:
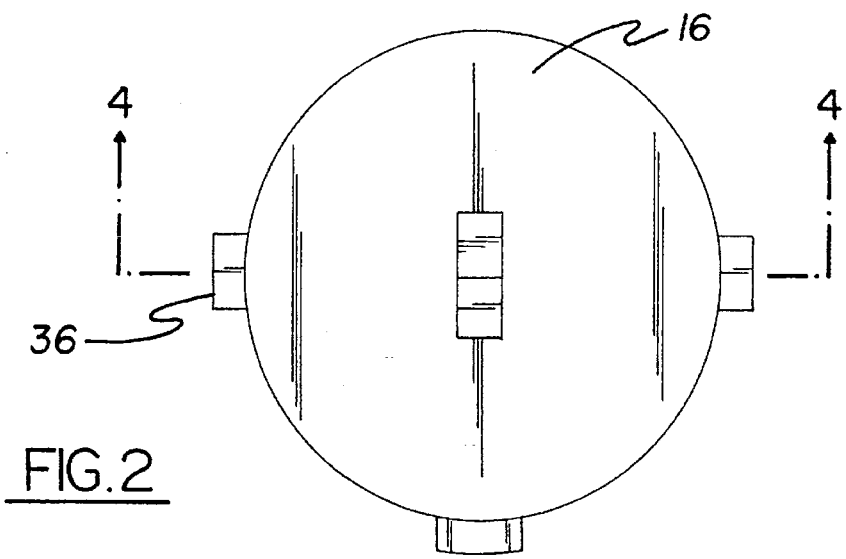
FIG. 2 is a top plan view of the present invention as shown in FIG. 1.

With reference now to the drawings, and in particular to FIG. 1 thereof, the preferred embodiment of the new and improved hand-held pet grooming apparatus embodying the principles and concepts of the present invention and generally designated by the reference numeral 10 will be described.

The present invention, the hand-held pet grooming apparatus 10 is comprised of a plurality of components. Such components in their broadest context include a housing, a vacuum chamber, bristles and a mechanism. Such components are individually configured and correlated with respect to each other so as to attain the desired objective.

Specifically, the present invention includes a generally cylindrical housing 14 that has a planar upper end 16 and a lower end 18 with a plurality of generally rectangular passages 20 therethrough. The housing, as seen in FIG. 1, is formed of a rigid plastic. Preferably, the plastic is chosen from any thermoplastic polymer or resin. The housing has a mechanism 24 located in an upper portion 26 of the housing for generating a vacuum. The mechanism has a switch 28 that extends from beyond the upper end. The switch moves backward and forward to turn the mechanism on and off. As shown in FIG. 4, the mechanism is powered by a pair of batteries 32.

Batteries are housed in individual battery chambers 34 that are positioned adjacent to the mechanism. The battery chambers are located in the upper portion of the housing and on opposite sides of the mechanism. Each battery chamber is accessible from the exterior of the housing through a door 36, as seen in FIG. 3. The door is rotatably coupled to the housing by a pivot pin 40. The interior upper corner of the door is fastened to the housing by a magnetic fastener assembly 44, as seen in FIG. 4. The magnetic fastener assembly prevents the door from swinging open during the use of the apparatus.

As best illustrated in FIG. 4, a vacuum chamber 48 is disposed within the housing, adjacent the lower end 18 and within a bottom portion 50 of the house in 14. The mechanism 24 when activated, induces a flowing system of air to pass through the passages 20 of the lower end of the housing. The air is capable of passing through the respective passages of the lower end and converges into the vacuum chamber. The air is ultimately exhausted out of a pair of exhaust vents 52 that are formed in the housing.

Also, an air chamber 54 separates the vacuum chamber 48 and the upper portion 26 of the housing. The air chamber, as shown in FIG. 4, is centrally disposed within the housing. The air chamber permits the continuous stream of air, being generated by the mechanism, to flow from within the vacuum chamber to and through the housing to exit through both of the exhaust vents 52.

Figure 5:
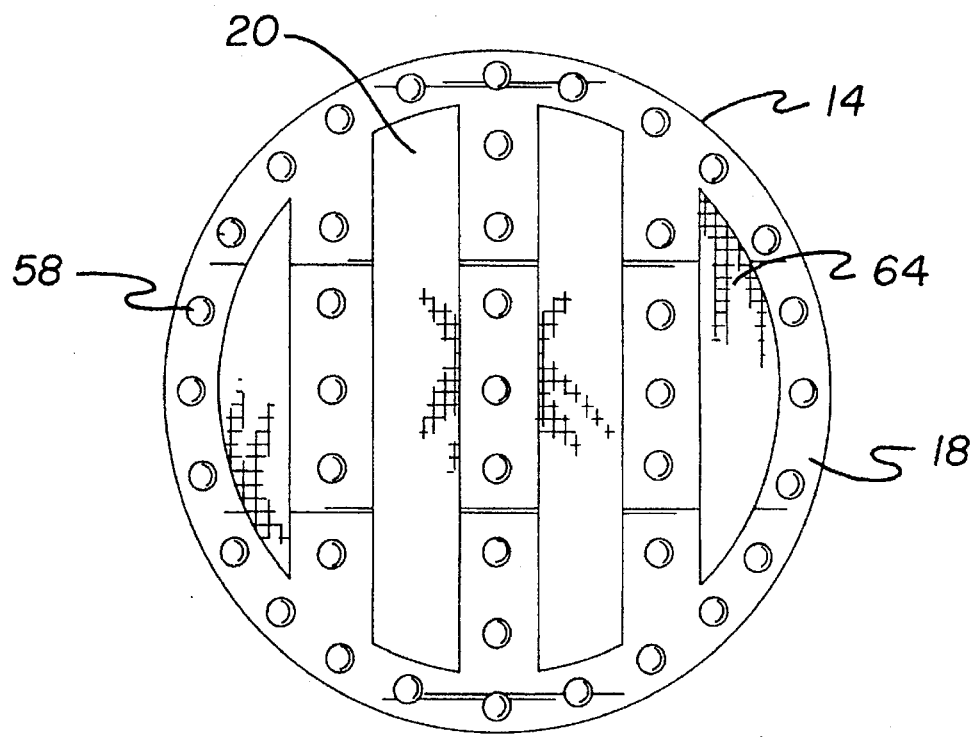
FIG. 5 is a bottom plan view of the present invention of FIG. 1.

The lower end of the housing 14 has a plurality of individual spaced bristles 58 formed thereon. The bristles project outwardly from the lower end 18 as seen in FIG. 5. The bristles are flexible and capable of engaging pet hair, when the mechanism 24 generates air for passage through the vacuum chamber. During use, the apparatus is pulled through the animals hair and against the skin. The flexible nature of the bristles prevent them from causing discomfort to the animal. In most instances the animal will find the process enjoyable.

Figure 6:
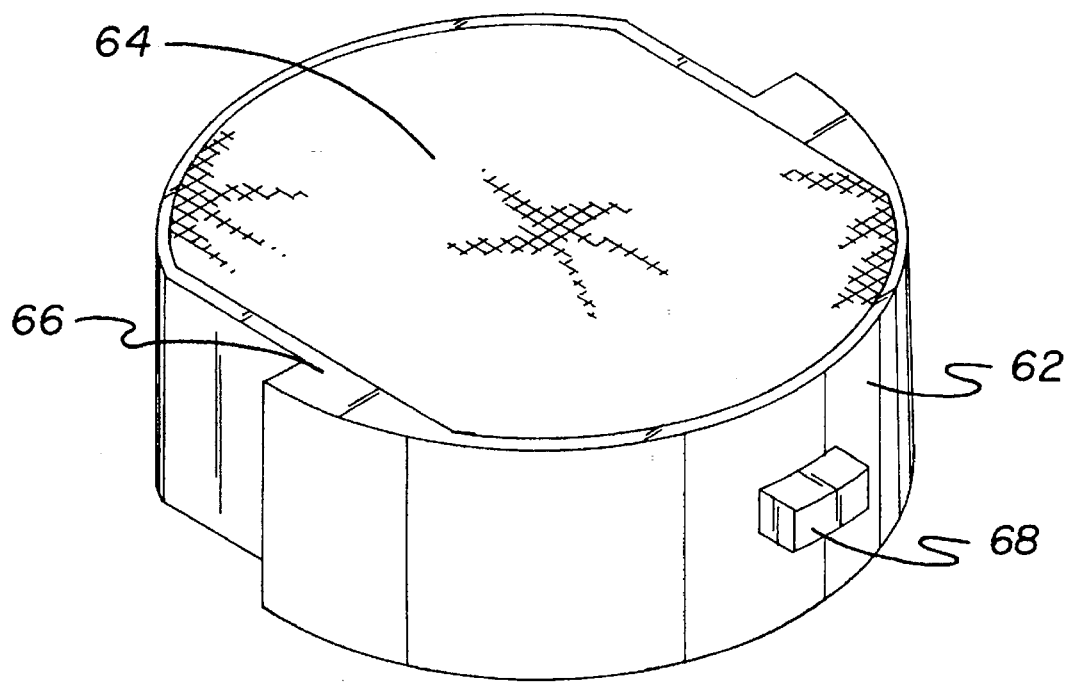
FIG. 6 is a sectional view of the hair catch member of the present invention.

Lastly, a generally cylindrical hair catch member 62 is provided. The hair catch member is slidably positioned within the vacuum chamber 48 of the housing. The hair catch member is capable of collecting hair and debris that is loosened from the pet when the bristles 58 engage the pet. The hair catch member has a porous-type material 64, as seen in FIG. 6, that is attached along a top rim 66. The porous-type material maybe be fabric, plastic screen or mesh screen. The porous-type material is chosen from the above group because they are reusable and washable. The porous-type material allows the air, generated by the mechanism, to pass through the catch member and into the air chamber. When the catch member is positioned within the vacuum chamber, the porous-type material will capture any lose hair and debris. The porous-type material will prevent any hair debris from entering into the upper portion and air chamber.

Furthermore, the hair catch member may be easily removed from the vacuum chamber when the mechanism is deactivated or turned off, for removal of captured hair and debris. Removal is easy, simply grab the handle 68 of the catch member and pull the handle in a direction away from the housing. Once the hair catch member is removed, the captured hair and debris are removed and the catch member is washed for use again.

The present invention is a hand-held pet grooming apparatus. The apparatus is battery operated so that is quiet running and not frightening to the animal. The apparatus is held in the hand and slowly and softly brushed over the animal's body. The hair that is matted on the animal's body will be dematted with the brushing. When dematting an animal's hair usually lose hair comes and other debris. This lose hair and debris will be vacuumed up into the hair catch member of the housing unit when the mechanism is turned on. While grooming the pet, the apparatus may be turn off and on for removal of the hair catch member, in order to remove any hair that has been captured. The apparatus is easily cleaned after grooming of the animal and very convenient to use. The apparatus may be used anywhere and can be carried when the animal travels with the caretaker or owner. Finally, the apparatus aides in the prevention of lose hair and debris from falling on the floor and on furniture when the animal is being groomed.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved hand-held pet grooming apparatus for brushing and removal of pet hair comprising in combination:

a generally cylindrical housing having a planer upper end and a lower end having a plurality of generally rectangular passages therethrough, the housing having a mechanism located in an upper portion of the housing for generating a vacuum, the mechanism having a switch that extends beyond the upper end, the switch moving backward and forward for turning the mechanism on and off, the mechanism capable of being powered by a pair of batteries positionable adjacent thereto, the upper portion of the housing having a pair of battery chambers positioned on opposite sides of the mechanism and being accessible from exterior the housing;

each battery chamber being accessible from the exterior the housing through a door that is rotatably coupled to the housing by a pivot pin, the door having an interior upper corner being fastened to the housing by a magnetic fastener assembly for preventing swinging of the door during operation of the grooming apparatus;

a vacuum chamber being disposed within the housing and adjacent the lower end within a bottom portion of the housing, the mechanism being capable of being activated for inducing air through the passages of the lower end of the housing, the air being capable of passing through the respective passages of the lower end and into the vacuum chamber for being exhausted out of a pair of exhaust vents formed in the housing;

an air chamber separates the vacuum chamber and the upper portion of the housing, the air chamber being centrally disposed within the housing and permits a continuous stream of air being generated by the mechanism to pass from the vacuum chamber to and through the housing to exit through both of the exhaust vents;

the lower end of the housing having a plurality of individually spaced bristles formed thereon and projecting outwardly therefrom, the bristles being flexible and capable of engaging pet hair when the mechanism generates air for passage through the vacuum chamber; and a generally cylindrical hair catch member being slidably positioned within the vacuum chamber of the housing, the hair catch member having a handle, the hair catch member being capable of collecting hair and debris being loosed from the pet when the bristles engage the pet, the hair catch member having a porous-type material being attached along a top rim thereof, the porous-type material being chosen from the group of material consisting of fabric, plastic screening and mesh screening because of their reusability, the porous-type material being capable of allowing air being generated by the mechanism to pass through the catch member when the member being positioned within the vacuum chamber, the catch member may be easily removed from the vacuum chamber when the mechanism being deactivated for removal of captured hair and debris, the handle of the catch member allowing the catch member to be pulled away from and out of the vacuum chamber.

* * * * *